(12) United States Patent
Becker et al.

(10) Patent No.: US 11,738,874 B2
(45) Date of Patent: Aug. 29, 2023

(54) AIRCRAFT HAVING HYBRID-ELECTRIC PROPULSION SYSTEM WITH ELECTRIC STORAGE LOCATED IN FUSELAGE

(71) Applicant: Hamilton Sundstrand Corporation, Charlotte, NC (US)

(72) Inventors: Frank Becker, Saint Lambert (CA); Xi Wang, Montreal (CA); Antonio Pizzi, Verdun (CA); Charles E. Lents, Amston, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 670 days.

(21) Appl. No.: 16/706,996

(22) Filed: Dec. 9, 2019

(65) Prior Publication Data

US 2020/0277061 A1     Sep. 3, 2020

Related U.S. Application Data

(60) Provisional application No. 62/812,821, filed on Mar. 1, 2019.

(51) Int. Cl.
| | |
|---|---|
| *B64D 27/02* | (2006.01) |
| *B64D 27/24* | (2006.01) |
| *B60L 50/60* | (2019.01) |
| *B64D 29/02* | (2006.01) |
| *B64D 37/04* | (2006.01) |

(Continued)

(52) U.S. Cl.
CPC .............. *B64D 27/02* (2013.01); *B60L 50/64* (2019.02); *B60L 50/66* (2019.02); *B64D 27/24* (2013.01); *B64D 29/02* (2013.01); *B64D 37/04* (2013.01); *H01M 50/204* (2021.01);

(Continued)

(58) Field of Classification Search
CPC ........ B64D 27/02; B64D 27/10; B64D 27/24; B64D 29/02; B64D 31/02; B64D 37/04; B64D 41/00; B64D 2027/026; B64D 2221/00; B60L 50/66; B60L 15/20; B60L 2200/10; B64C 3/32; B64C 3/34
See application file for complete search history.

(56) References Cited

U.S. PATENT DOCUMENTS

| | | | |
|---|---|---|---|
| 8,099,944 | B2 | 1/2012 | Foster et al. |
| 10,035,604 | B2 | 7/2018 | Bak et al. |

(Continued)

FOREIGN PATENT DOCUMENTS

| | | | |
|---|---|---|---|
| EP | 3305653 | A1 | 4/2018 |
| EP | 3312087 | A1 | 4/2018 |

(Continued)

OTHER PUBLICATIONS

PCT International Search Report and Written Opinion dated Sep. 29, 2020, issued during the prosecution of PCT International Application No. PCT/US2019/065140.

(Continued)

*Primary Examiner* — Joshua J Michener
*Assistant Examiner* — Cindi M Curry
(74) *Attorney, Agent, or Firm* — Locke Lord LLP; Scott D. Wofsy; Alicia J. Carroll (57) ABSTRACT

An aircraft includes a fuselage defining a longitudinal axis between a forward end and an aft end. The aircraft includes an electrical system having an electric storage. The electric storage is positioned within the fuselage.

17 Claims, 9 Drawing Sheets

(51) Int. Cl.
   *B60L 50/64*   (2019.01)
   *H01M 50/204*  (2021.01)
   *H01M 50/249*  (2021.01)

(52) U.S. Cl.
   CPC ..... *H01M 50/249* (2021.01); *B64D 2027/026* (2013.01); *B64D 2221/00* (2013.01); *H01M 2220/20* (2013.01)

(56) References Cited

U.S. PATENT DOCUMENTS

| | | | |
|---|---|---|---|
| 10,153,636 | B1 | 12/2018 | Vander Lind et al. |
| 10,177,424 | B1 | 1/2019 | Melack et al. |
| 10,351,232 | B2 * | 7/2019 | McCullough ....... B64C 29/0033 |
| 2006/0273596 | A1 | 12/2006 | Durbin |
| 2008/0011900 | A1 | 1/2008 | Quintana |
| 2008/0121755 | A1 | 5/2008 | Bennett |
| 2008/0184906 | A1 | 8/2008 | Kejha |
| 2009/0050741 | A1 * | 2/2009 | Muller ..................... A62C 3/08 244/121 |
| 2009/0145998 | A1 | 6/2009 | Salyer |
| 2009/0283343 | A1 | 11/2009 | Wurth |
| 2010/0122864 | A1 | 5/2010 | Rosman |
| 2011/0024555 | A1 | 2/2011 | Kuhn, Jr. |
| 2011/0187119 | A1 | 8/2011 | McMaster |
| 2012/0019008 | A1 | 1/2012 | Hughley |
| 2013/0009469 | A1 | 1/2013 | Gillett |
| 2013/0049364 | A1 | 2/2013 | Teets et al. |
| 2013/0147204 | A1 | 6/2013 | Botti et al. |
| 2014/0010652 | A1 * | 1/2014 | Suntharalingam ..... B64D 27/02 475/5 |
| 2014/0014424 | A1 | 1/2014 | Boncodin |
| 2014/0345281 | A1 | 11/2014 | Galbraith |
| 2014/0346283 | A1 | 11/2014 | Salyer |
| 2015/0136897 | A1 | 5/2015 | Seibel et al. |
| 2015/0311755 | A1 | 10/2015 | Hiebl et al. |
| 2016/0009402 | A1 * | 1/2016 | Hunter .................. B64D 27/02 244/53 R |
| 2016/0229532 | A1 | 8/2016 | Shapery |
| 2017/0085090 | A1 | 3/2017 | Marzouk et al. |
| 2017/0291712 | A1 * | 10/2017 | Himmelmann ........ B64D 27/10 |
| 2017/0327219 | A1 * | 11/2017 | Alber ..................... B64C 29/02 |
| 2018/0112648 | A1 | 4/2018 | Bond |
| 2018/0191011 | A1 | 7/2018 | Halsey |
| 2018/0237146 | A1 | 8/2018 | Bak et al. |
| 2018/0244386 | A1 | 8/2018 | Phan |
| 2018/0281931 | A1 * | 10/2018 | Miller ..................... F01D 15/10 |
| 2018/0304753 | A1 * | 10/2018 | Vondrell ................. B64C 21/06 |
| 2019/0001804 | A1 | 1/2019 | Wilhide |
| 2019/0004580 | A1 | 1/2019 | Wilhide |
| 2019/0296300 | A1 * | 9/2019 | Zimmermann ... H01M 10/6556 |
| 2020/0017228 | A1 * | 1/2020 | Combs .................. B64D 31/02 |
| 2020/0198792 | A1 * | 6/2020 | Joshi ........................ F02C 6/00 |
| 2020/0290742 | A1 * | 9/2020 | Kumar .................. B64D 27/10 |

FOREIGN PATENT DOCUMENTS

| | | |
|---|---|---|
| EP | 3459842 A1 | 3/2019 |
| JP | 2011006041 A | 1/2011 |
| JP | 2012056558 A | 3/2012 |
| JP | 2013193533 A | 9/2013 |
| JP | 2014227140 A | 12/2014 |
| JP | 2015137092 A | 7/2015 |
| JP | 6213494 B2 | 10/2017 |
| KR | 20080005377 U | 11/2008 |
| KR | 20110087661 A | 8/2011 |
| KR | 20110104405 A | 9/2011 |
| KR | 20130073244 A | 7/2013 |
| KR | 101343453 B1 | 12/2013 |
| KR | 101638964 B1 | 7/2016 |
| KR | 101667330 B1 | 10/2016 |
| KR | 20160147339 A | 12/2016 |
| KR | 20170010295 A | 1/2017 |
| KR | 20170097482 A | 8/2017 |
| KR | 101815287 B1 | 1/2018 |
| KR | 20180101555 A | 9/2018 |
| WO | 2010020199 A1 | 2/2010 |
| WO | 2015154545 A1 | 10/2015 |
| WO | 2015181512 A1 | 12/2015 |
| WO | 2016178770 A1 | 11/2016 |
| WO | 2017020987 | 2/2017 |

OTHER PUBLICATIONS

Extended European Search Report dated Nov. 3, 2022, issued during the prosecution of European Patent Application No. EP 19917580.3, 12 pages.

\* cited by examiner

AIRCRAFT HAVING HYBRID-ELECTRIC PROPULSION SYSTEM WITH ELECTRIC STORAGE LOCATED IN FUSELAGE

CROSS-REFERENCE TO RELATED APPLICATIONS

This application claims priority to U.S. Provisional Patent Application No. 62/812,821 filed Mar. 1, 2019 the contents of which are incorporated by reference herein in their entirety.

BACKGROUND OF THE INVENTION

1. Field of the Invention

The present disclosure relates to an aircraft having a hybrid-electric propulsion system, and more particularly, to an aircraft having a hybrid-electric propulsion system with batteries that are located in the fuselage of the aircraft.

2. Description of Related Art

Aircraft engines vary in efficiency and function over a plurality of parameters, such as thrust requirements, air temperature, air speed, altitude, and the like. Aircraft require the most thrust at take-off, wherein the demand for engine power is the heaviest. However, during the remainder of the mission, the aircraft engines often do not require as much thrust as during take-off. The size and weight of the engines allows them to produce the power needed for take-off, however after take-off the engines are in effect over-sized for the relatively low power required to produce thrust for cruising in level flight.

The conventional techniques have been considered satisfactory for their intended purpose. However, there is an ever present need for improved aircraft engines. This disclosure provides a solution for this need.

SUMMARY

An aircraft includes a fuselage defining a longitudinal axis between a forward end and an aft end. The aircraft includes an electrical system having an electric storage. The electric storage is positioned within the fuselage.

In accordance with some embodiments, the aircraft includes a hybrid electric propulsion system. The electrical system can be part of the hybrid electric propulsion system. The hybrid electric propulsion system can include a heat engine and/or an electric motor. The electrical system can be electrically coupled to the electric motor by way of a 1000-volt power bus. The electrical system and/or the electric storage can be operatively connected to the electric motor for receiving power therefrom or for supplying power thereto. The electrical system can be part of the hybrid electric propulsion system. The aircraft can include a 28V aircraft power system connected to the hybrid electric propulsion system for generating 28V of aircraft power supply for aircraft systems.

In some embodiments, the fuselage defines an interior cabin space. The interior cabin space can include a cabin floor. The electrical system can include a plurality of batteries. The plurality of batteries can be mounted to the cabin floor. The cabin floor can define a lower surface. The plurality of batteries can be mounted to the lower surface of the cabin floor. The electric motor controller can be mounted to the lower surface of the cabin floor. The electric motor controller can be mounted to at least one of the plurality of batteries, on a side of the batteries that is opposite from the cabin floor. The aircraft can include at least one airfoil extending laterally from the fuselage and a nacelle mounted to the airfoil. The electric motor can be mounted within the nacelle. The heat engine and the electric motor can be positioned within the nacelle. The aircraft can include a liquid fuel tank. The liquid fuel tank can be positioned at least one of inboard of or outboard of the nacelle.

In some embodiments, the fuselage includes at least one opening for providing fluid communication between an area outside of the fuselage and an electrical compartment in which the electric storage is positioned. The fuselage can include a venting line for fluid communication between an area outside of the fuselage and an electrical compartment in which the electric storage is positioned. The fuselage can include an electrical compartment in which the electric storage is positioned. The electrical compartment can be made from a material that is fire proof and/or fire resistant, and/or can include a lining that is fire proof and/or fire resistant. The electrical system can include an electric-motor controller. The fuselage can include an electrical system compartment in which the electric-motor controller and the electric storage are positioned. The electric storage can include at least one battery. The electric storage can include a plurality of batteries. The electric storage can include a liquid cooling circuit. The fuselage can include an electrical compartment in which the plurality of batteries are stored. The electrical compartment can include sections configured and adapted to contain a respective portion of the plurality of batteries. Each section can be divided from adjacent sections by a fire resistant and/or fire proof wall. The fuselage can include a floor, e.g. a cargo area/bay floor, wherein the plurality of batteries are mounted to the floor.

These and other features of the systems and methods of the subject disclosure will become more readily apparent to those skilled in the art from the following detailed description of the embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE EMBODIMENTS

Figure 1:
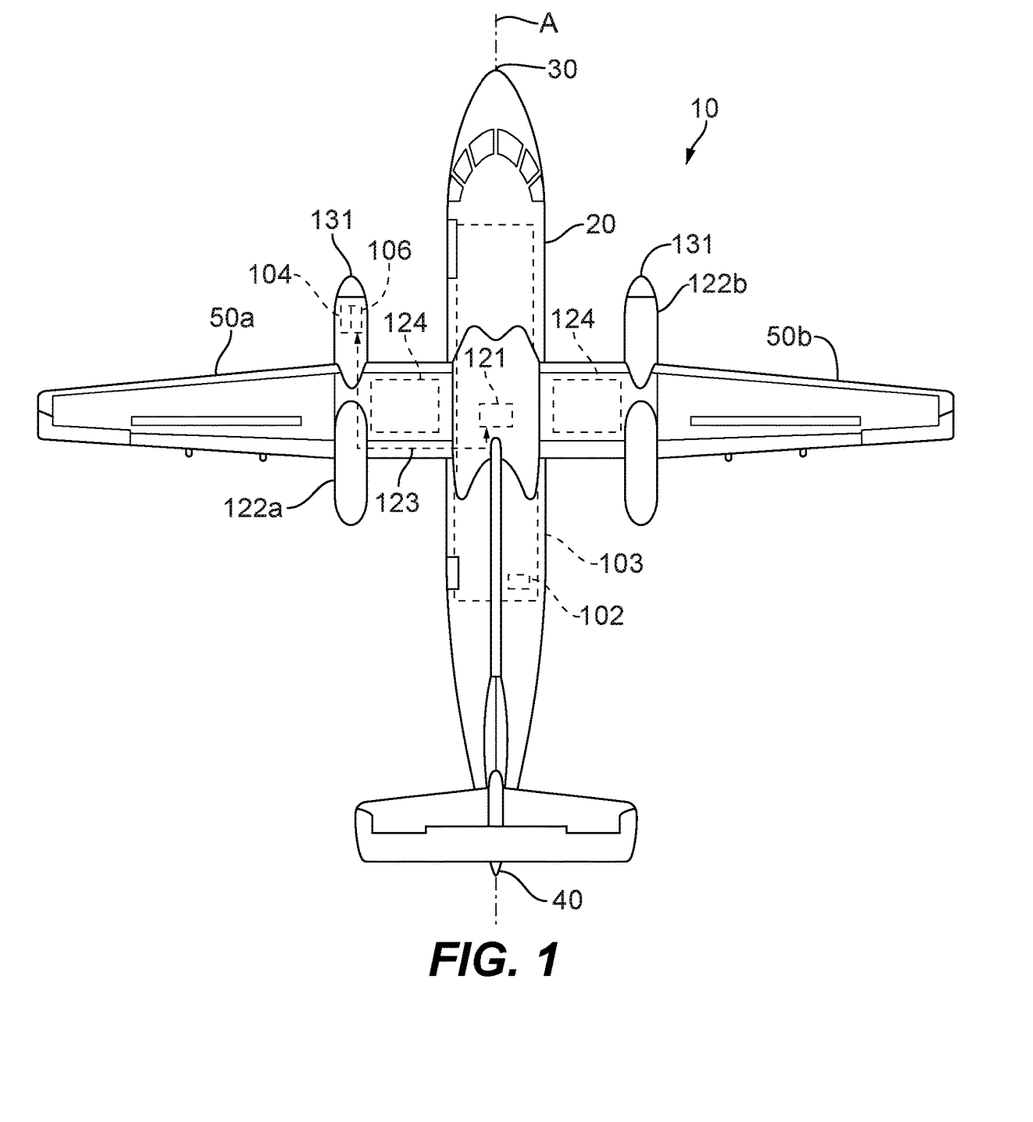
FIG. 1 is a schematic depiction of a top plan view of an embodiment of an aircraft constructed in accordance with the present disclosure, showing batteries positioned within the fuselage of the aircraft.

Reference will now be made to the drawings wherein like reference numerals identify similar structural features or aspects of the subject disclosure. For purposes of explanation and illustration, and not limitation, a partial view of an exemplary embodiment of an aircraft constructed in accordance with the present disclosure is shown in FIG. 1 and is designated generally by reference character 10. Other embodiments of aircraft 10 in accordance with the disclosure, or aspects thereof, are provided in FIGS. 2-9, as will be described. The systems and methods described herein can be used to provide hybrid propulsion, e.g., for improving fuel efficiency in aircraft. Moreover, embodiments described herein can readily apply to all-electric aircraft, or the like.

Figure 2:
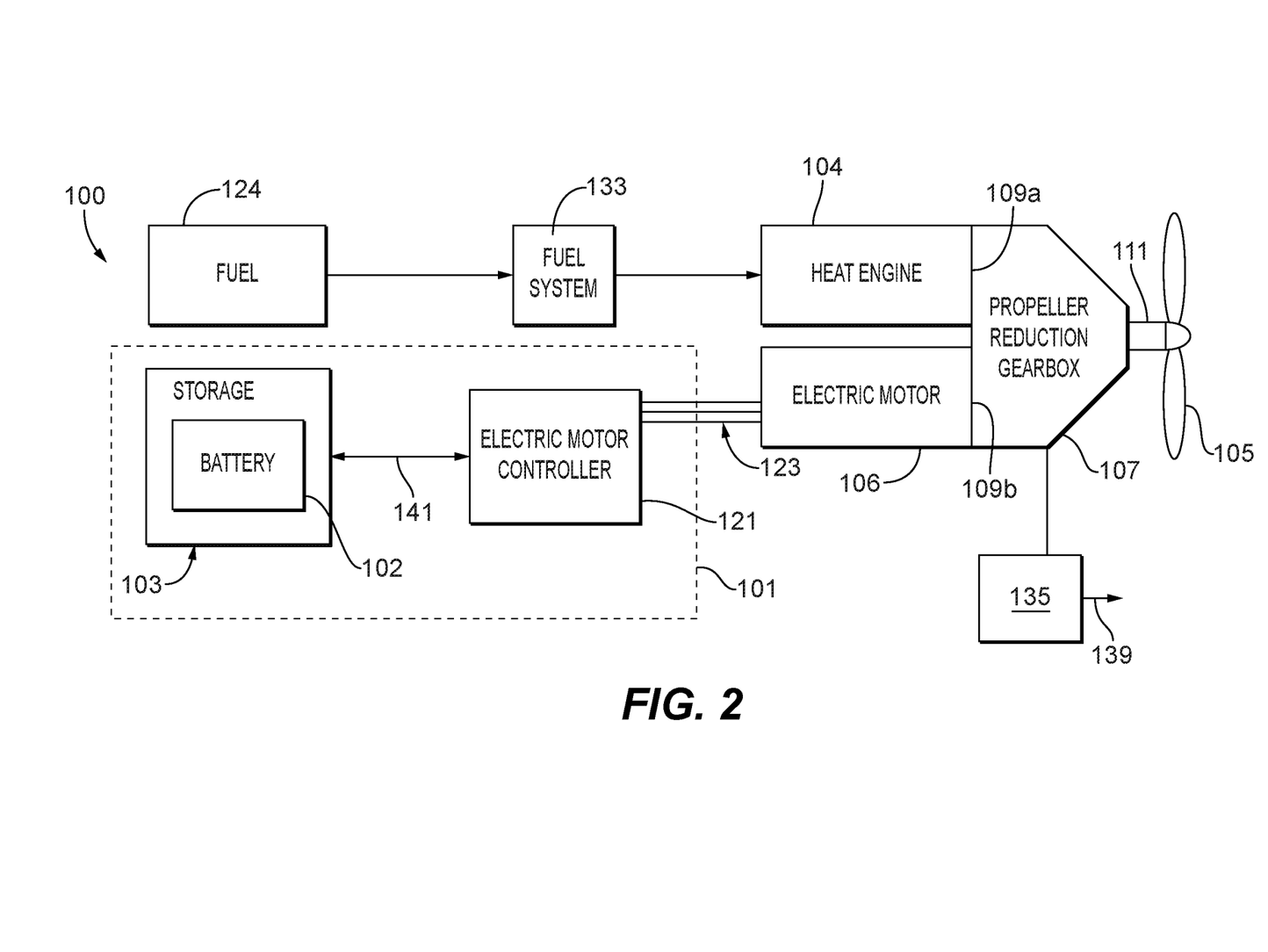
FIG. 2 is a schematic depiction of an embodiment of a hybrid electric propulsion system constructed in accordance with the present invention, showing the batteries operatively connected to the electric motor-controller and the electric motor.

As shown in FIGS. 1-2, an aircraft 10 includes a fuselage 20 defining a longitudinal axis A between a forward end 30 and an aft end 40. Airfoils 50a and 50b laterally extend from the fuselage 20. Each airfoil 50a and 50b includes a respective nacelle 122a and 122b mounted to thereto. The aircraft 10 includes a hybrid electric propulsion system 100, portions of which are disposed in first nacelle 122a. An electrical system 101 is part of the hybrid electric propulsion system 100.

With continued reference to FIGS. 1-2, the hybrid electric propulsion system 100 includes a heat engine 104, e.g. a thermal engine, and an electric motor 106, which on their own or together drive an air mover 105, e.g. a propeller, fan or the like, by way of a reduction gear box 107 and shaft 111. Air movers 105 are not shown in FIG. 1, but it is contemplated that each nacelle 122a and 122b would include a respective air mover 105 mounted on their forward facing hubs 131. Reduction gear box 107 has an input 109a for heat engine 104 and an input 109b for electric motor 106. Those skilled in the art will also readily appreciate that a clutch can be disposed between reduction gear box 107 and the heat engine 104 and another clutch can be disposed between electric motor 106 and reduction gear box 107. The aircraft 10 also includes liquid fuel tanks 124. While fuel tanks 124 are shown inboard of their respective nacelles 122a and 122b, those skilled in the art will readily appreciate that the liquid fuel tanks 124 can be positioned outboard of their respective nacelles 122a/122b, or a combination of inboard and outboard of their respective nacelles 122a/122b.

It is contemplated that heat engine 104 could be a heat engine of any type, e.g., a gas turbine, spark ignited, diesel, rotary or reciprocating engine of any fuel type and with any configuration of turbomachiney elements, either turbocharger, turbosupercharger, supercharger and exhaust recovery turbo compounding, either mechanically, electrically, hydraulically or pneumatically driven.

Figure 3:
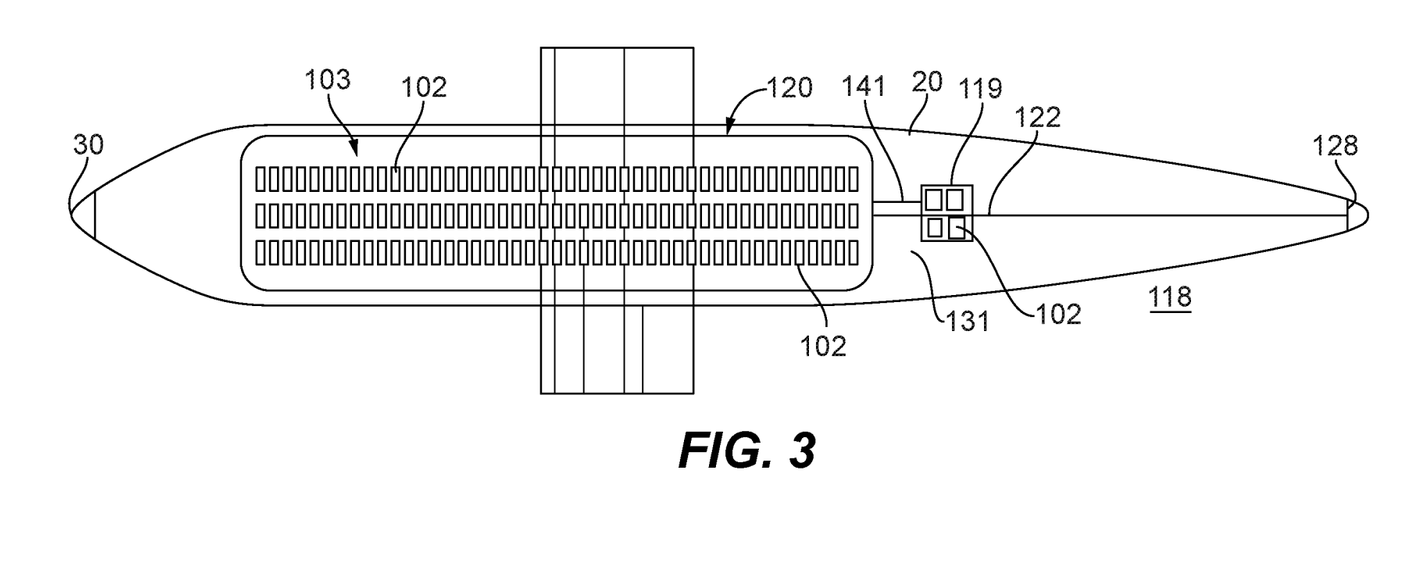
FIG. 3 is a schematic depiction of a bottom plan view of a portion of the aircraft of FIG. 1, showing batteries positioned in the fuselage.

With continued reference to FIGS. 1-3, the electrical system 101 includes an electric storage 103 that includes a battery bank, or the like. The storage 103 is made up of a plurality of batteries 102. Batteries 102 can be rechargeable batteries. The electric storage 103 is positioned within the fuselage 20. The electrical system 101, e.g. an electric motor controller 121 and the storage 103, is electrically coupled to the electric motor 106 by way of a high voltage power bus 123. High voltage power bus 123 can be for 500 V or greater, e.g. a range from 890-1000 V, or higher. The high voltage power bus 123 is bi-directional, meaning power can go to electric-motor 106 from electric-motor controller 121 and from electric-motor 106 to electric-motor controller 121. The high voltage power bus 123 extends from electric motor controller 121, up the cabin wall, into a wing space above the fuselage 20, and extends outward to connect to an electric motor 106. If, like in FIG. 8, the electric motor controller 121 is positioned in the nacelle 122a, a conductor or bus 141 can extend from the electric storage 103, up the cabin wall, into a wing space above the fuselage 20, and outwardly to connect to the electric motor controller 121. The electrical system 101 and the electric storage 103 are operatively connected to the electric motor 106 for receiving power therefrom or for supplying power thereto.

The electric motor controller 121 is positioned between electric motor 106 and electric storage 103. It is contemplated that an electrical distribution system or battery management system can be positioned within the storage 103, or between storage 103 and the electric-motor controller 121. The electrical distribution system and/or battery management system is configured for managing the electrical power from the power storage 103, e.g. the batteries 102, to the electric-motor 106. A separate conductor or bus 141 connects electric storage 103 to electric motor controller 121. The aircraft 10 includes a 28V aircraft power system 135 connected to the hybrid electric propulsion system 100 for generating 28V of aircraft power supply for aircraft systems via output 139.

In some embodiments, the electrical system 101 also includes a separate electrical storage 103, e.g. a battery bank 119, outside of the batteries 102 integrated with the cabin floor 112. Battery bank 119 can include a plurality of batteries 102 stacked vertically and horizontally and, in FIG. 3, is positioned in an aft portion of fuselage 20. Those skilled in the art will readily appreciate that battery bank 119 can be positioned in other locations as well. Battery bank 119 is also connected by way of bus 141 to the electrical storage 103 in the cabin floor 112 and the electric-motor controller.

Figure 4:
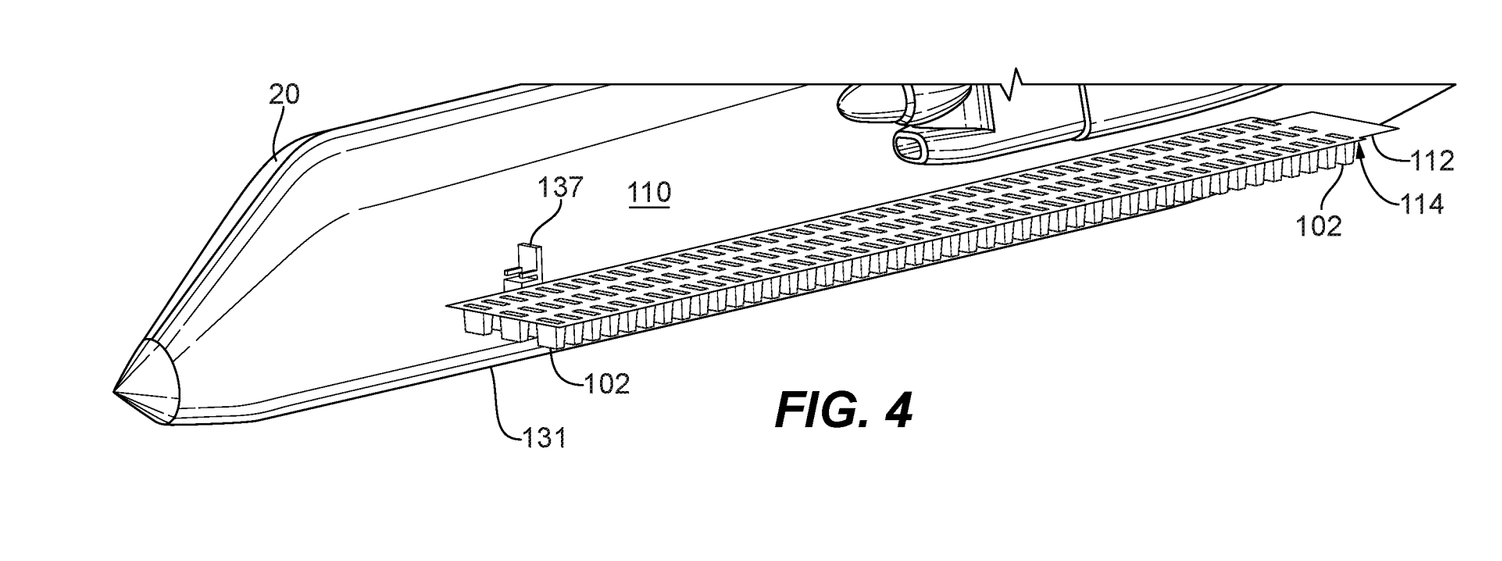
FIG. 4 is a schematic depiction of a perspective cut-away view of a portion of the aircraft of FIG. 1, showing batteries integrated with the cabin floor.
Figure 5:
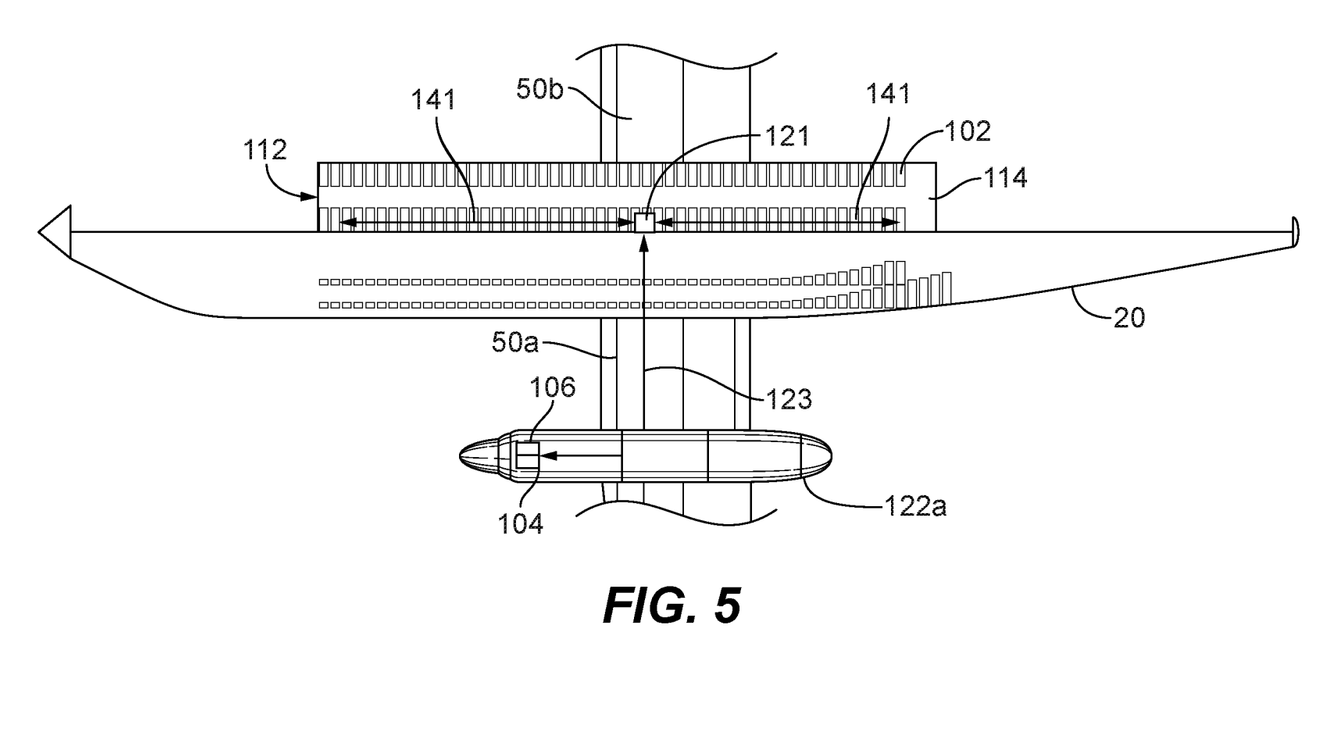
FIG. 5 is a schematic depiction of a cut-away view of a portion of the aircraft of FIG. 1 as viewed from a bottom of the fuselage, showing the electric-motor controller mounted in the fuselage.
Figure 6:
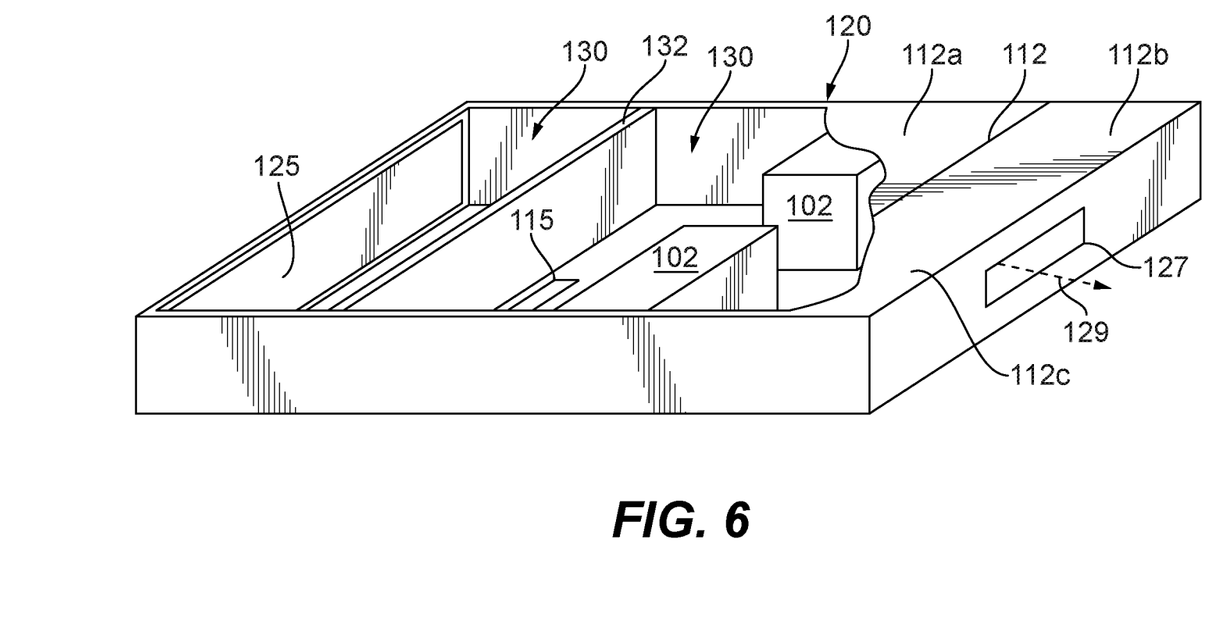
FIG. 6 is a schematic depiction of a perspective view of a portion of the electrical compartment constructed in accordance with the present disclosure, where the electrical compartment is integrated with the cabin floor, showing a portion of the cabin floor cut-away to show batteries.
Figure 7:
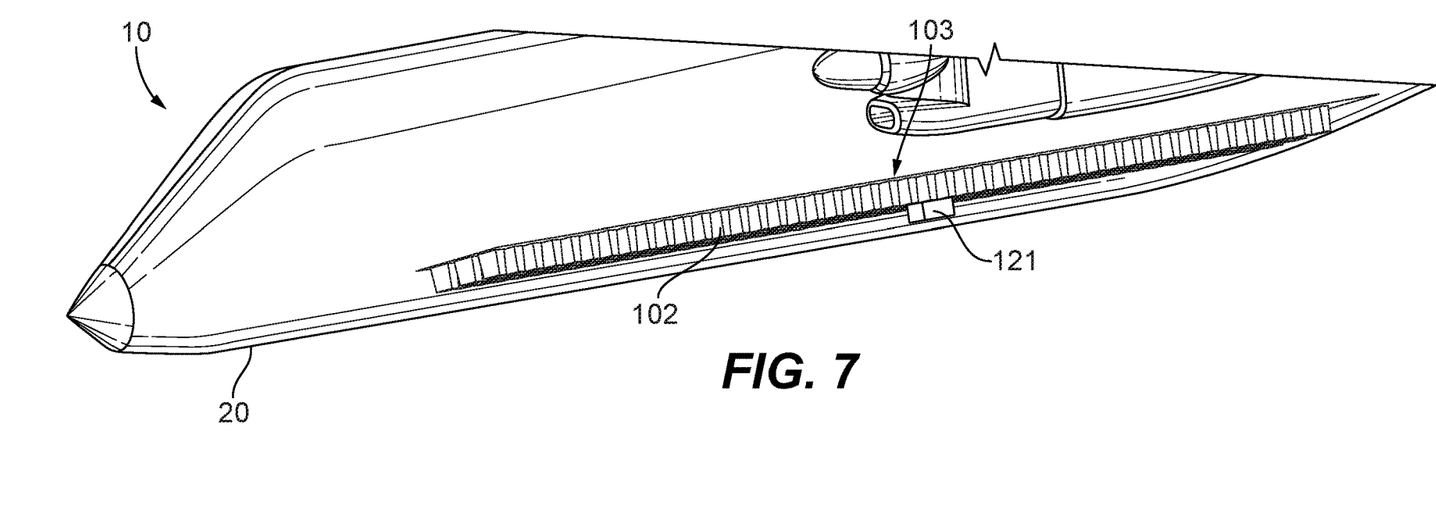
FIG. 7 is a schematic depiction of a perspective cut-away view of a portion of an alternative embodiment of an aircraft constructed in accordance with the present disclosure, showing the electric motor controller underneath the batteries.
Figure 8:
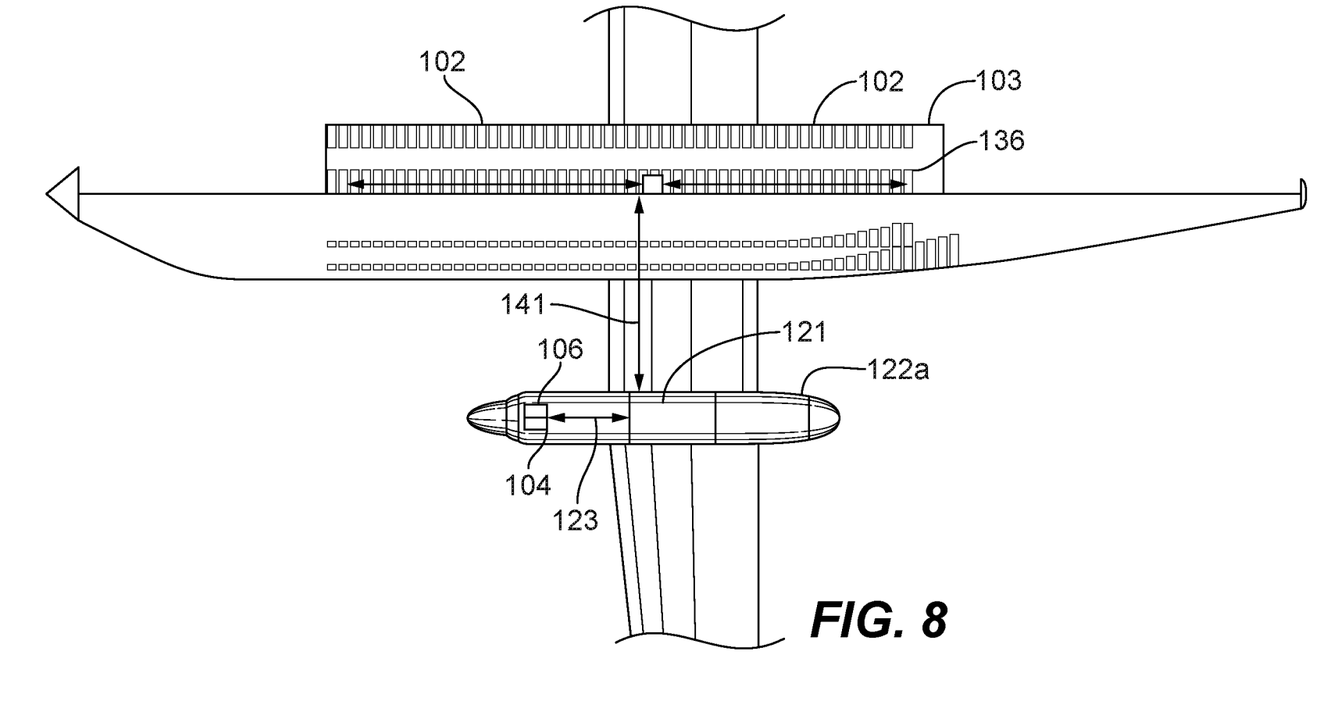
FIG. 8 is a schematic depiction of a bottom cut-away view of a portion of an alternative embodiment of an aircraft constructed in accordance with the present disclosure, showing the electric-motor controller mounted in the nacelle and a liquid cooling circuit.

As shown in FIGS. 2 and 5, the batteries 102 are operatively connected to the electric motor 106 for receiving power therefrom or for supplying power thereto by way of an electric-motor controller 121. It is also contemplated that batteries 102 are connected to one or more inverter/rectifier components (for example, positioned between storage 103 and electric motor 106) for supplying power from the storage 103 to drive the electric motor 106, or, in an energy recovery mode, to store into the storage 103 energy generated by driving the electric motor 106 in a generator mode As shown in FIGS. 4-5, the fuselage 20 defines an interior cabin space 110. The interior cabin space 110 includes a cabin floor 112 and at least one passenger seat 137 positioned on the cabin floor 112. The plurality of batteries 102 are mounted to a lower surface 114 of the cabin floor 112 and are at least partially contained within an electrical system compartment 120. Electrical system compartment 120 is similarly integrated with cabin floor 112, as shown in FIG. 6. However, those skilled in the art will readily appreciate that batteries 102 can be integrated on their own without compartment 120 (similar to what is shown in FIG. 4). Those skilled in the art will also readily appreciate that floor integration is not limited to the cabin floor 112 and that batteries can be integrated into a floor of the cockpit, cargo area, or the like (above and/or below the floor), or other suitable location. The electric motor controller 121 is mounted to the lower surface 114 of the cabin floor 112, similar to the batteries 102. The integration of the batteries 102 and compartment 120 with cabin floor 112 provides for a space-conscious solution to storing the electrical power needed to drive hybrid-electric propulsion system 100. While shown mounted to the lower surface 114 of the cabin floor 112, one skilled in the art will readily appreciate that electric motor controller can be positioned in a variety of suitable locations throughout the fuselage 20. For example, electrical system compartment 120, in some embodiments, also includes the electric-motor controller 121. In some embodiments, as shown in FIG. 7, the electric motor controller 121 is mounted to at least one of the plurality of batteries 102, on a side of the batteries 102 that is opposite from the cabin floor 112. In another embodiment, as shown in FIG. 8, the electric motor controller 121 is mounted in the nacelle 122*a*.

As shown in FIGS. 3 and 6, the fuselage 20 includes an aft vent opening 128 defined between the area 118 outside of the fuselage 20 and corresponding openings 115 and 127 in the electrical compartment 120. The vent opening 128 is in fluid communication with opening 127 of compartment 120 between the area 118 outside of the fuselage 20 and the electrical compartment 120 where the batteries 102 are positioned. Electrical compartment 120 is in fluid communication with a venting line 122. The venting line 122 provides fluid communication between the electrical compartment 120 and the area 118 outside of the fuselage 20 via vent opening 128. Venting can be integrated within the cabin pressurization system including using check valves (one-way valves) to prevent return flow into cabin (e.g. a check valve could be posisioned on venting line 122. Air from electrical compartment 120 is vented out of openings 115 and/or 127 to venting line 122, as indicated schematically by arrow 129. Cabin floor 112 can be divided into one or more panels 112*a*, 112*b* or 112*c*, each panel can include one or more corresponding batteries 102 mounted to thereto.

Vent opening 128 allows heat, fumes, or the like to be dissipated from the electrical storage 103, e.g. the group of batteries 102, in compartment 120. Vent opening 128 (and/or corresponding openings 115 and/or 127, described below) can include fire detection and/or fire extinguishing methods and systems. It is also contemplated that heat dissipated from electrical storage 103 can be used for anti-ice or de-icing, or general heating of the aircraft 10 and its components (e.g. cabin, etc.). The heat can be directed to a given area as needed, directly, by way of heat exchanger, or the like.

As shown in FIG. 6, electrical compartment 120 includes a fire resistant and/or proof lining 125. It is also contemplated that in lieu of or in addition to the lining 125, each compartment 120 can be made from a fire proof and/or fire resistant material, or be constructed in another suitable fire resistant and/or proof configuration. In FIG. 6, for sake of clarity, only some of batteries 102 are shown. Electric motor controller 121, also not shown for sake of clarity, would similarly be positioned in electrical compartment 120 to batteries 102. The electrical compartment 120 includes sections 130 configured and adapted to contain a respective portion of the plurality of batteries 102. Each section 130 is divided from adjacent sections 130 by a fire resistant and/or proof wall 132. Each section 130 is configured and adapted to contain a respective portion of the plurality of batteries 102.

With reference to FIG. 8, in accordance with another embodiment, the aircraft 10 includes a liquid cooling circuit 136 that is configured and adapted to flow through compartment 120 in between batteries 102 to provide cooling. Liquid cooling circuit 136 can be supplied with coolant via a coolant system that is on-board aircraft 10, or can be fluidly connected to a coolant system on ground, for example, during recharging on-ground. The liquid cooling circuit can be connected to a ground cart that includes the remaining portions of the cooling system (e.g. pump, coolant, etc.) or it can be contained within aircraft 10. If contained in aircraft 10, various coolant system components, such as a radiator, heat exchanger or the like, may be included. Aircraft 10 is substantially the same as aircraft 10 of the other figures except for the inclusion of liquid cooling circuit 136 and the position of electric motor controller 121 (described above). The liquid cooling circuit 136 and/or the position of electric motor controller 121 can be incorporated into the embodiments of aircraft 10 described and shown in other figures, e.g. FIGS. 1-7, as needed.

Figure 9:
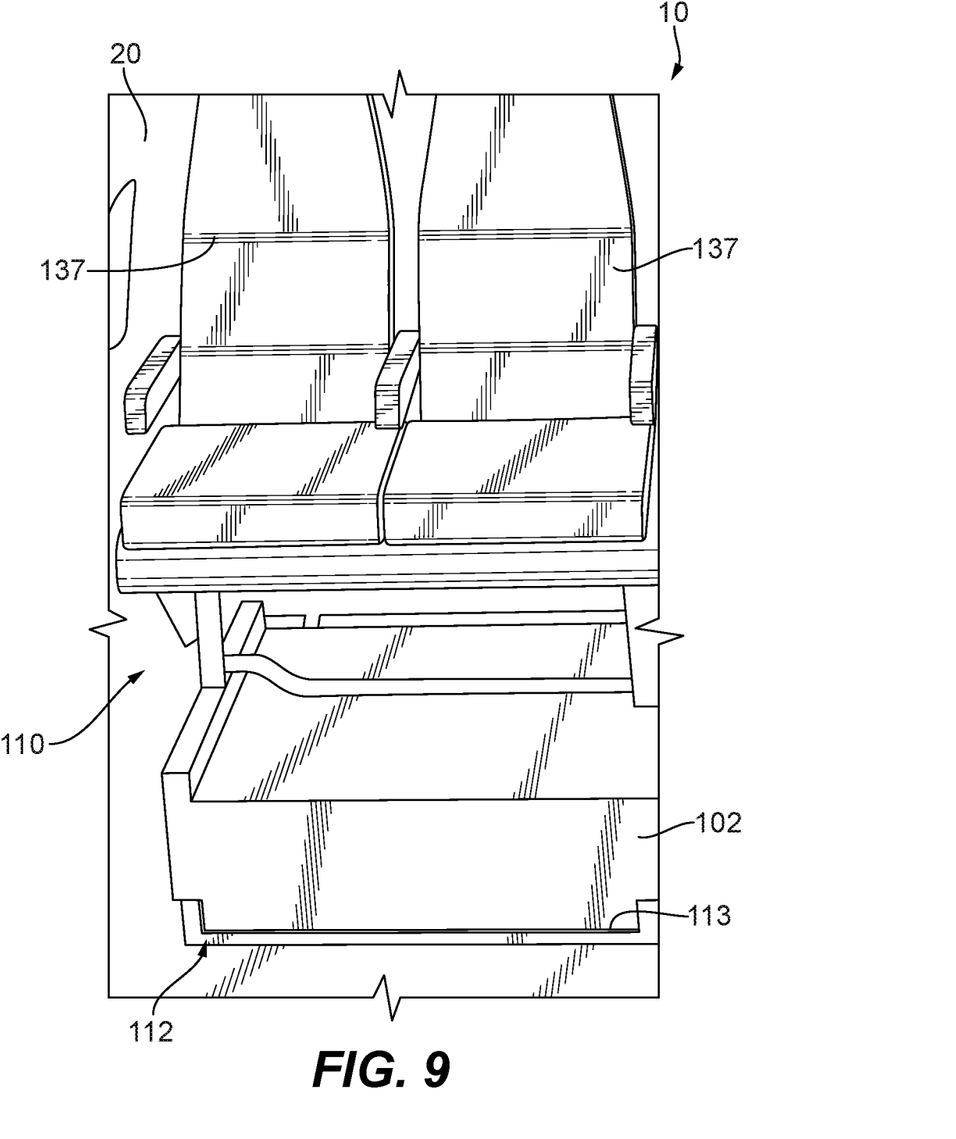
FIG. 9 is a schematic depiction of a portion of an alternative embodiment of an aircraft constructed in accordance with the present disclosure, showing a plurality of batteries mounted on top of a cabin floor.

As shown in FIG. 9, an alternative embodiment of aircraft 10 is shown. Aircraft 10 of FIG. 9 is substantially the same as aircraft 10 of FIGS. 1-7 except that a battery 102 is mounted on a top surface 113 of a cabin floor 112. The interior cabin space 110 includes the cabin floor 112 and at least one passenger seat 137 positioned on the battery 102, which are disposed on top of the cabin floor 112. In essence, the battery 102 essentially becomes the floor that passengers would walk on. While shown and described as a singular battery, those skilled in the art will readily appreciate that a plurality of batteries 102 can be positioned on top of cabin floor 112. It is contemplated that batteries 102 could be contained in a compartment, similar to compartment 120, even if on top of cabin floor 112. An electric motor controller, not shown, can be similar to electric-motor controller 121, and can be similarly mounted on top of cabin floor 112, or elsewhere in the fuselage or aircraft. Those skilled in the art will readily appreciate that a combination of batteries 102 can be positioned above and/or below the floor.

The methods and systems of the present disclosure, as described above and shown in the drawings provide for hybrid-electric and/or electric propulsion systems with superior properties including improved energy storage and use of hybrid heat engine and electric motor power. While the apparatus and methods of the subject disclosure have been shown and described with reference to certain embodiments, those skilled in the art will readily appreciate that change and/or modifications may be made thereto without departing from the scope of the subject disclosure.

What is claimed is:

1. An aircraft comprising:
   a fuselage defining a longitudinal axis between a forward end and an aft end;
   an electrical system having an electric storage, wherein the electric storage is positioned within the fuselage;
   at least one airfoil extending laterally from the fuselage; and
   a liquid fuel tank positioned within the at least one airfoil, wherein the aircraft is a fixed-wing, parallel hybrid aircraft, wherein the fuselage defines an interior cabin space, wherein the interior cabin space includes a cabin floor having at least one seat mounted thereon, wherein the electrical system includes a plurality of batteries, wherein the plurality of batteries are mounted on an opposite side of the cabin floor from the at least one seat, wherein the cabin floor defines a lower surface, wherein the electric motor controller is mounted to at least one of the plurality of batteries, on a side of the batteries that is opposite from the lower surface of the cabin floor.

2. The aircraft as recited in claim 1, further comprising a hybrid electric propulsion system, wherein the electrical system is part of the hybrid electric propulsion system, wherein the hybrid electric propulsion system includes a heat engine.

3. The aircraft as recited in claim 2, wherein the hybrid electric propulsion system includes an electric motor, wherein the electrical system is electrically coupled to the electric motor by way of a 1000-volt power bus.

4. The aircraft as recited in claim 2, wherein the hybrid electric propulsion system includes an electric motor, wherein the electrical system is electrically coupled to the electric motor by way of a 500-volt or greater power bus.

5. The aircraft as recited in claim 2, wherein the hybrid electric propulsion system includes an electric motor, wherein the electrical system and the electric storage are operatively connected to the electric motor for receiving power therefrom or for supplying power thereto.

6. The aircraft as recited in claim 1, further comprising a nacelle mounted to the airfoil.

7. The aircraft as recited in claim 6, further comprising an electric motor mounted within the nacelle, wherein the electrical system is electrically coupled to the electric motor by way of a 1000-volt power bus.

8. The aircraft as recited in claim 6, further comprising a hybrid electric propulsion system, wherein the electrical system is part of the hybrid electric propulsion system, wherein the hybrid electric propulsion system includes a heat engine and an electric motor, wherein the electric storage is operatively connected to the electric motor for receiving power therefrom or for supplying power thereto, and wherein the heat engine and the electric motor are positioned within the nacelle.

9. The aircraft as recited in claim 6, wherein the liquid fuel tank is positioned at least one of inboard of or outboard of the nacelle.

10. The aircraft as recited in claim 1, wherein the fuselage includes at least one opening for providing fluid communication between an area outside of the fuselage and an electrical compartment in which the electric storage is positioned.

11. The aircraft as recited in claim 1, wherein the fuselage includes a venting line for fluid communication between an area outside of the fuselage and an electrical compartment in which the electric storage is positioned.

12. The aircraft as recited in claim 1, wherein the fuselage includes an electrical compartment in which the electric storage is positioned, wherein the electrical compartment includes a lining that is at least one of fire proof or fire resistant.

13. The aircraft as recited in claim 1, wherein the electrical system includes an electric-motor controller, wherein the fuselage includes an electrical system compartment in which the electric-motor controller and the electric storage are positioned.

14. The aircraft as recited in claim 1, wherein the electric storage includes a plurality of batteries, wherein the fuselage includes an electrical compartment in which the plurality of batteries are stored.

15. The aircraft as recited in claim 1, wherein the electric storage includes a liquid cooling circuit.

16. The aircraft as recited in claim 1, further comprising a hybrid electric propulsion system, wherein the electrical system is part of the hybrid electric propulsion system, wherein the hybrid electric propulsion system includes a heat engine and an electric motor, the aircraft further comprising a 28V aircraft power system connected to the hybrid electric propulsion system for generating 28V of aircraft power supply for aircraft systems.

17. The aircraft as recited in claim 1, wherein the plurality of batteries are mounted to the lower surface of the cabin floor.

* * * * *